United States Patent [19]
Ishizawa et al.

[11] B 3,923,561
[45] Dec. 2, 1975

[54] METHOD OF HEAT TREATING SAW

[76] Inventors: Toushichi Ishizawa; Seiya Ishizawa, both of 1-289, Kutsunoya, Shizuoka, Shizuoka, Japan

[22] Filed: May 8, 1973

[21] Appl. No.: 358,311

[44] Published under the Trial Voluntary Protest Program on January 28, 1975 as document no. B 358,311.

[30] Foreign Application Priority Data
Aug. 17, 1972  Japan................................ 47-81853
Aug. 17, 1972  Japan................................ 47-81852
Apr. 28, 1973  Japan................................ 48-48871

[52] U.S. Cl. .............................................. 148/147
[51] Int. Cl.² ........................................... C22D 9/24
[58] Field of Search ................................... 148/147

[56]  References Cited
UNITED STATES PATENTS
538,979   5/1895   Platt.................................. 148/147
1,887,098  11/1932  Klopp ........................... 148/147 X
2,327,129   8/1943  Runan................................ 148/147
2,958,524  11/1960  Delapena........................ 148/147 X FOREIGN PATENTS OR APPLICATIONS
46-30367   3/1971  Japan................................ 148/147

*Primary Examiner*—L. Dewayne Rutledge
*Assistant Examiner*—Arthur J. Steiner
*Attorney, Agent, or Firm*—Browdy and Neimark

[57]  ABSTRACT

A method of heat treating a saw in which a cutting edge portion of the saw is solely exposed out from the surface of water while the remaining portion of the saw is submerged in water when the cutting edge portion is heated, immediately after the edge portion is heated, the edge portion is quenched to harden the same only.

6 Claims, 7 Drawing Figures

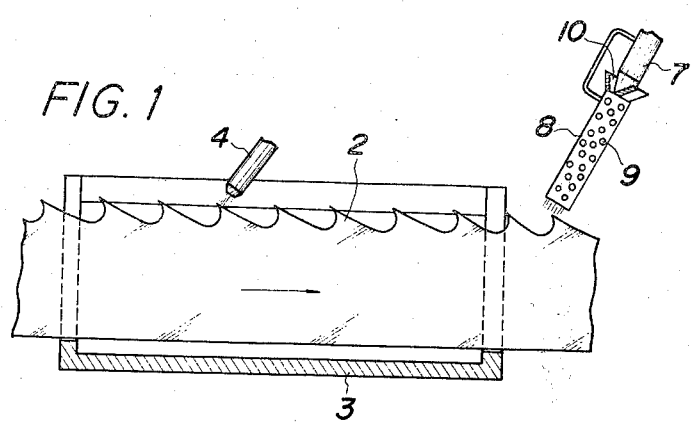
FIG. 1
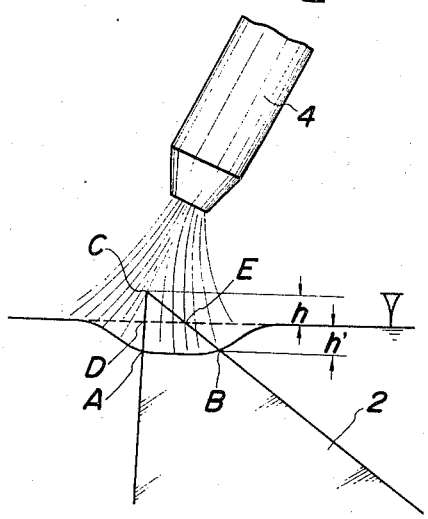
FIG. 2
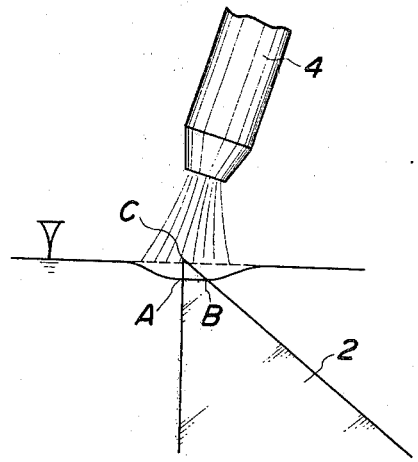
FIG. 3
FIG. 4

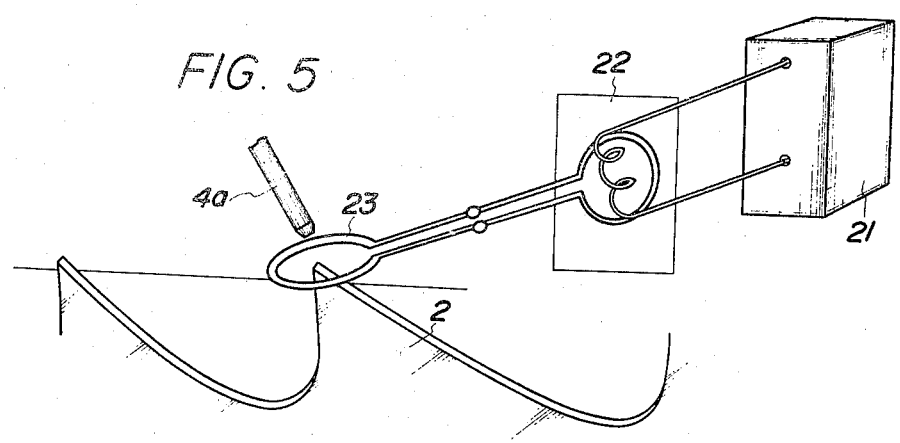
FIG. 5
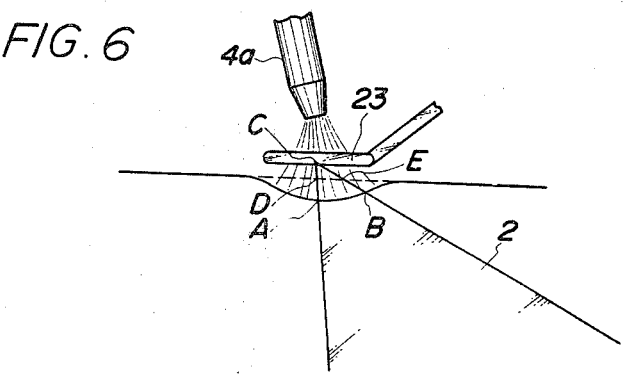
FIG. 6
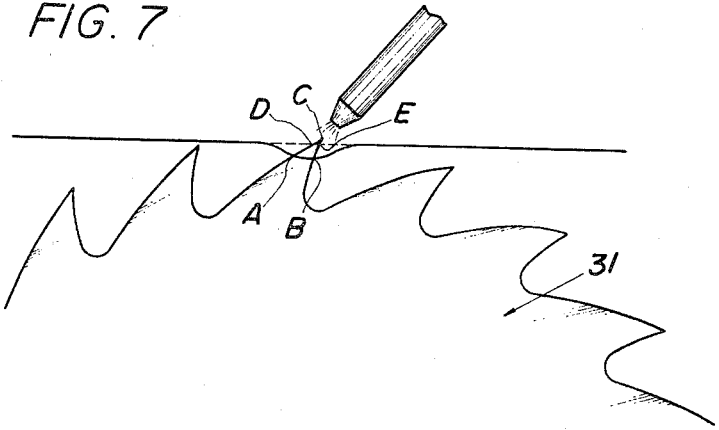
FIG. 7

METHOD OF HEAT TREATING SAW

BACKGROUND OF THE INVENTION

It has been known heretofore to heat treat cutting edges of saw teeth for the purpose of improving sharpness and durability thereof and when the cutting edges are worn after a period of use, said edges are ground and provided with a set wrest parted in the middle thereof or pressed out to provide a divergent set wrest on the saw teeth.

However, the existing method of heat treating in which the whole of the saw teeth is quenched has a disadvantage that the whole of the saw teeth has a high hardness so that the cutting edges are broken down when said set wrest is formed.

It is, therefore, necessary to uniformly temper the saw teeth to bring a desired hardness or to remove the whole of the hardened teeth portions prior to provide said set wrest if the whole of the saw teeth is hardened.

It is difficult to uniformly temper the hardened edge portion so as to make it into the same hardness as that of the body portion of the teeth at each time for providing said set wrest and this process requires much labor. Furthermore, the grinding process for removing the whole of the hardened edge portion results in a loss of the saw material and results in a large consumption of time and expenses.

With the foregoing consideration in mind, it is a principal object of the present invention to provide a new method of heat treating saws such as ripsaws, circular saws and band saws in which the quenching for the cutting edge is effected in a limited minimum area of the cutting edge where it is needed for cutting and thereby being possible to remove easily the hardened edge portion by a grinding more or less than the usual grinding when the cutting edge is worn.

The further object of the present invention is to provide a method for heat treating the saws in which only the cutting edge portion is quenched without hardening the base portion of the saw tooth as well as the body of saw, thereby in case of band saws the cutting edge becomes durable without loss of necessary flexibility for movement along a curved pass.

The present invention is characterized in that a cutting edge portion of a saw tooth such as portions through 1 – 2 mm from the cutting edge is heated by means of flame, induction heating or the like while the remaining portion of the tooth and the body of the saw is submerged in quenching medium or coolant such as water or oil so as to harden only the cutting edge portion without heat treating the remaining portion and when the temperature at the edge portion is raised to a predetermined temperature, the heated edge portion is quenched by said quenching medium or coolant or by means of jets of another quenching medium or coolant. The method of exposing the cutting edge portion out from the coolant may be effected by different means. For example, in case of heating by flame, the saw to be treated is supported in the coolant in such a manner that the cutting edges are projecting slightly from the level of the coolant or are substantially submerged in the coolant so as to project said cutting edge portion from the surface of the coolant by depressing the surface of the coolant around the cutting by means of the force of flame.

That is, in the case of heating by flame the position of the cutting edges relative to the level of coolant is determined by the force of the flame.

In the case of electric or high frequency induction heating, jets of heated or unheated air under pressure are directed towards the cutting edge portion to be heated so that bubbles are prevented from rising around said cutting edge portion as well as the surface of the coolant around said edge portion is depressed to project the edge portion from the surface of the coolant in an amount of 1 – 3 mm.

When the cutting edge portion is heated to a temperature required for quenching, for example 760° – 820°C, which depends upon the material of the saw, the heating means or the saw itself is moved by one pitch of saw teeth and thereby heat is shut off. As the result of this, said heated edge portion is quenched and hardened to a hardness of Rockwell C 61 – 62 because the largest portion of the tooth is submerged in the coolant and the contact area between the tooth and the coolant becomes relatively large, on the other hand the volume of heated edge portion is very small and the depressed surface is returned to the level of coolant after heating is performed.

Then, the saw or the heating means is moved pitch by pitch by means of 2 crank or the like and each of the cutting edge portions of the saw teeth is quenched successively in the same manner as above mentioned until all of the saw teeth are quenched.

When said quenching process is performed or immediately after each of the cutting edge portions is quenched, each of the quenched edge portions is reheated to a tempering temperature by a conventional heating means such as a weak flame, electric heating, medium - or high frequency induction heating and then is subjected to air cooling. When the tempering temperature is 150° – 160°C, the hardness of the cutting edge comes to Rockwell C 59 – 60 and when the tempering temperature is 170° – 200°C, the hardness comes to Rockwell C 57 – 58.

When such a heat treatment is effected, the boundary between the hardened and unhardened portion in the saw teeth is very definite and the area of the hardened portion in each tooth is substantially uniform so that when the set wrest is provided after use by two or three periods of grinding, the hardened edge portion will be removed completely by light grinding and further the life for cutting per one grinding is about 3 – 20 times that of the existing untreated saw.

The invention will become more readily apparent from the following examples in which a band saw of steel consisting of 0.80 – 0.90% C, less than 0.35% Si, less than 0.50% Mn, less than 0.03% P and less than 0.03% Si and having a hardness of Rockwell C 46 – 48 is heat treated in accordance with the accompanying drawings.

BRIEF DESCRIPTION OF THE DRAWINGS

FIG. 1 is a side elevation of one embodiment in accordance with the invention using a flame as the means of heating;

FIG. 2 is a schematic side view on an enlarged scale showing the relation between the cutting edge of the band saw and the surface of coolant;

FIG. 3 is a schematic side view of another embodiment in which the cutting edge substantially coincides with the level of water;

FIG. 4 is a graph showing the hardness of the cutting edge when the edge is projected from the level of water by 1 mm and is quenched, with the horizontal axis showing the distance from the cutting edge and the vertical axis showing the hardness;

FIG. 5 is a perspective view of a further embodiment using a high frequency heating device;

FIG. 6 is a side elevational view of the same; and

FIG. 7 is a schematic side view of a further embodiment in which a circular saw is heat treated in accordance with the invention.

EXAMPLE 1

Referring to FIG. 1, the body of a band saw is indicated at 1 and has a series of teeth 2 inclined towards one direction at one side thereof.

A vessel is indicated at 3 which contains water from which cutting edge portions of the teeth are projected a distance of 0.5 – 1.5 mm. A conventional heating device 4 such as oxygen gas or acetylene gas burner and the like is positioned above the cutting edge. Said band saw body 1 may be translated in the horizontal direction at a constant speed or intermittently with one tooth at a time by means of a crank arm or other conveying means. Thus, as seen in FIG. 2, the moving edge is projected from the surface of water by a distance of ($h$), for example 1 mm and is heated to 800°C by flame from the oxygen gas burner 4 during which time the surface of water around the edge of the tooth is depressed by the force of the flame to a depth of ($h'$), for example 1 mm. When the thus heated edge portion is moved away from the flame, the depressed surface of water around the edge portion rises up to the level of water (D.E) and the edge portion is immediately quenched since the heat of the edge portion has a narrow area as shown by $\overline{CDE}$ is quickly taken away by the wide surface as shown by contact line $\overline{DE}$ and furthermore, the distance ($h$) from the surface of water to the cutting edge is small such as 0.5 – 2 mm so that the heat absorption from the edge portion $\overline{CDE}$ at the contact line $\overline{DE}$ is effected instantaneously. If the rate of quenching is changed, a nozzle will be provided behind the gas burner and connected to a compressor, a water supply pump or the like so that the edge portion may be cooled by air or water.

The hardness of the teeth 2 quenched as above mentioned is determined and as shown in FIG. 4 in which the solid line refers to a case wherein the heat treatment was effected with the cutting edge portion being projected from the surface of water a distance of 1 mm.

When the quenching operation for one cutting edge is completed as mentioned above, the band saw is moved one pitch by means of a crank arm and then the next cutting edge is quenched in the same manner. Similarly, each of the remaining saw teeth is moved and quenched pitch by pitch.

For the purpose of improving the hardness and toughness of the hardened cutting edge portion, a tempering burner 7 is provided behind the quenching burner 4 in the conveying direction, the flame of the burner 7 is directed to the path of the teeth 2 through a flame conduit 8, the conduit 8 having air suction holes 9 on the wall and an inlet opening 10 at upper end thereof so as to heat the cutting edge to a temperature of 150° – 250°C and to effect the heating of the cutting edge even though the force of the flame is weak. Thus, the cutting edge portion is heated to a tempering temperature and then air cooled when the band saw 1 is moved by one pitch of the teeth 2.

According to the heat treatment mentioned above, only the cutting edge portions of the teeth of the band saw are heated and quenched so that only the cutting edge portion is hardened without loss of the toughness of the body of the band saw and make it possible to provide superior sharpness. Furthermore, the portions under the line $\overline{AB}$ of the saw teeth and the saw body is heat treated about 450°C and hardened to Rockwell C46–47. Since such a hardness and their structure are not affected by the tempering temperature of 150° – 250°C, it is capable to remove the hardened edge portions by slight grinding when a swage process for the cutting edge is required so that the body of the band saw is reasonably utilized without loss thereof and said swage process can be easily effected.

EXAMPLE 2

This example shows another embodiment of heating. Referring to FIG. 3, the band saw 1 is submerged in water in such a manner that the cutting edges of the teeth 2 substantially coincide with the level of the water. The flame of the gas burner 4 has a proper force and is directed towards a cutting edge of the tooth 2 so that the surface of water around the cutting edge is depressed as shown to project the cutting edge from the surface of water 0.5 – 1.5mm by the force of flame.

When the cutting edge is heated to a proper quenching temperature, for example 820°C, the band saw is moved by one pitch of the teeth 2 and the heated cutting edge is immediately submerged into water and quenched.

As mentioned in Example 1, in this example also the water contact with the heated portion of the teeth bubbles up and evaporates when the cutting edge is heated to a high temperature such as 820°C, but the bubbles and the steam are restrained or eliminated by the flame with the result that a stable concaved surface of water is formed around the cutting edge so that the edge is effectively heated in a definite zone without intermediate hardened layer by the water bubbles spread out as shown by the imaginery line in FIG. 4.

EXAMPLE 3

Referring to FIGS. 5 and 6 showing a method of heating by means of high frequency induction heating, a high frequency generator is indicated at 21, a power transformer is indicated at 22 and an annular working coil is indicated at 23. High frequency is supplied from the high frequency generator 21 to said coil 23 through the transformer 22.

The saw blade is also submerged in water in such a manner that the cutting edges of the teeth 2 are projected from the water surface. Said annular working coil 23 is positioned above the cutting edges so that when the saw blade is moved by one pitch of the teeth or in a constant speed to position a cutting edge of tooth 2 directly under the center of the coil 23, only the cutting edge portion is heated to a temperature of 760° – 820°C by the inductive action of the magnetism radiation from the working coil 23. The bubbles raising up around the heated cutting edge portion is preferably restrained by jets of heated or unheated air under pressure directed towards the cutting edge. In this case, the cutting edge of the tooth 2 may be previously projected from the water level by 1mm. Thus, when the cutting edge is moved under the center of the coil, the water surface is depressed to the line $\overline{AB}$ by jets of air so that the edge is further projected from the water surface by 2mm as the whole.

The thus heated cutting edge is moved by one pitch so as to position the next cutting edge under the center of the coil and the water surface around the cutting edge is returned to the level of water. As the result, the cutting edge portion C is quenched and the saw tooth 2 is hardened since the very small portion $\overline{CDE}$ shown in FIG. 6 is immediately cooled by the relatively wide surface $\overline{DE}$.

This is of course also followed by the tempering process as mentioned above in the quenching of the teeth.

EXAMPLE 4

Referring to FIG. 7 showing a method of quenching the teeth 2 of a circular saw 31, the saw 31 is mounted on a transverse supporting shaft inserted into the center hole 32 thereof and is submerged in water in the same manner as mentioned in example 1 or 2 so that the cutting edge of at least the uppermost tooth 2 is projected from the water surface by 1mm or substantially coincides with the water surface. The cutting edge is also heated to a quenching temperature as mentioned above by heating means such as a gas burner 4 or the like and then the circular saw 31 is rotated by one pitch of the teeth 2 to submerge the heated cutting edge into water and immediately quench it. Such quenching cycle is repeated for each tooth 2 of the saw. When all of the teeth 2 have been quenched, the saw 31 is taken out of the water and is tempered in the same manner as mentioned in example 1.

While the above mentioned example 1, 2 and 3 have been described particularly in connection with a method of heat treatment in which the saw band itself is moved by one pitch of the teeth 2, the gas burner or the working coil of the high frequency induction heating device may be moved along the band saw without moving the band saw and also in the case of quenching a ripsaw which is not shown, the ripsaw or the heating means may be moved in the same manner as in the case of the band saw.

It will be understood that various modifications may be made without departing from the spirit of the invention and that the invention is not to be considered as being limited otherwise than as set forth in the claims which follow.

We claim:

1. A method of heat-treating saws comprising the steps of placing the saw in a cooling liquid such that the tooth ends project no more than about 2 mm above the liquid surface while keeping the other tooth portion as well as the saw body submerged in the cooling liquid, blowing gas on said said saw tooth portion so as to form a 1 to 2 mm deep depression or hollow in the liquid surface surrounding said saw tooth end portion to thereby let said tooth end portion rise up higher above the liquid surface, heating said portion to the hardening temperature while maintaining the above-said condition, then separating said heated tooth end portion away from the heating means and the depression forming means to allow the depressed liquid surface around the tooth end portion to restore the normal planar state to thereby quench the heated tooth end portion.

2. The method of claim 1, wherein said means for forming a depression in the liquid surface around the saw tooth end portion and said means for heating the saw tooth end portion exposed above the liquid surface are a flame.

3. The method of claim 1 wherein immediately following the hardening step, flame from a gas burner is introduced to the opening at an upper part of a flame conduit having a plurality of air suction holes, and the lower end of said flame conduit is placed in front of the hardened saw tooth end portion to heat said portion, thereby to accomplish tempering and hardening synchronously with each other with movement of the saw.

4. The method of claim 1 comprising the steps of placing the saw in the liquid coolant such that the tooth ends project no more than about 2 mm above the liquid surface while keeping the other tooth portion as well as the saw body submerged in the cooling liquid, blowing heated or non-heated air to said saw tooth end portion to form a 1 to 2 mm deep depression or hollow in the liquid surface surrounding said tooth end portion, heating said tooth end portion to a hardening temperature by high frequency induction heating while maintaining the above-said condition, and then separating said heated tooth end portion away from said high frequency induction heating means and depression forming means to allow the depressed liquid surface around said tooth end portion to restore the normal planar state to thereby quench the heated tooth end portion.

5. The method of claim 1 wherein said saw is immersed in said liquid coolant such that the edges of the teeth are substantially flush with the surface of the liquid coolant.

6. The method of claim 1 wherein said gas is air.

* * * * *